(12) United States Patent
Ejima

(10) Patent No.: US 8,564,936 B2
(45) Date of Patent: Oct. 22, 2013

(54) PORTABLE INFORMATION PROCESSING TERMINAL

(75) Inventor: Daisuke Ejima, Tokyo (JP)

(73) Assignee: NEC Corporation, Tokyo (JP)

( * ) Notice: Subject to any disclaimer, the term of this patent is extended or adjusted under 35 U.S.C. 154(b) by 195 days.

(21) Appl. No.: 12/675,936

(22) PCT Filed: Oct. 6, 2008

(86) PCT No.: PCT/JP2008/068154
§ 371 (c)(1),
(2), (4) Date: Mar. 1, 2010

(87) PCT Pub. No.: WO2009/048038
PCT Pub. Date: Apr. 16, 2009

(65) Prior Publication Data
US 2011/0205694 A1  Aug. 25, 2011

(30) Foreign Application Priority Data
Oct. 11, 2007  (JP) ................ 2007-265118

(51) Int. Cl.
*H05K 5/00* (2006.01)
*H05K 7/00* (2006.01)
*G06F 3/02* (2006.01)
*H04M 1/00* (2006.01)

(52) U.S. Cl.
USPC ............ 361/679.01; 361/679.56; 361/679.27; 361/679.15; 361/679.16; 345/169; 455/575.4

(58) Field of Classification Search
USPC ............ 361/679.01, 679.02, 679.08, 679.09, 361/679.3, 679.55–679.59; 455/325, 556.1, 455/550.1, 90.1, 575.1, 575.3, 575.4, 575.8
See application file for complete search history.

(56) References Cited

U.S. PATENT DOCUMENTS

2006/0046797 A1 * 3/2006 Chen ...................... 455/575.4

FOREIGN PATENT DOCUMENTS

| EP | 1686768 A2 | 8/2006 |
|---|---|---|
| EP | 1786357 A2 | 3/2007 |
| JP | 2003125052 A | 4/2003 |
| JP | 2004040490 A | 2/2004 |
| JP | 2005147401 A | 6/2005 |
| JP | 2006211576 A | 8/2006 |
| JP | 2007049294 A | 2/2007 |
| JP | 2007116712 A | 5/2007 |
| JP | 2007174372 A | 7/2007 |
| JP | 2007174617 A | 7/2007 |
| JP | 2007179525 A | 7/2007 |

(Continued)

OTHER PUBLICATIONS

International Search Report for PCT/JP2008/068154 mailed Nov. 25, 2008.

(Continued)

*Primary Examiner* — Jayprakash N Gandhi
*Assistant Examiner* — Jerry Wu

(57) ABSTRACT

To reduce the thickness and improve the operability. It includes a first housing and a second housing placed on top of each other, and connecting means to connect the first and second housings, the connecting means being interposed between the first and second housings, wherein the connecting means engages with the first housing so as to be slidable in at least one direction with respect to the first housing, and engages with the second housing so as to be rotatable with respect to the second housing.

8 Claims, 25 Drawing Sheets

(56) References Cited

FOREIGN PATENT DOCUMENTS

| | | | |
|---|---|---|---|
| JP | 2008103989 A | 5/2008 | |
| WO | 2006030607 A | 3/2006 | |
| WO | 2006038499 A | 4/2006 | |

OTHER PUBLICATIONS

Supplementary European Search Report for EP 08 83 7502 Issued Dec. 28, 2011.

* cited by examiner

PORTABLE INFORMATION PROCESSING TERMINAL

TECHNICAL FIELD

The present invention relates to a portable information processing terminal, in particular a portable information processing terminal in which housings placed on top of each other can be moved with respect to each other.

BACKGROUND ART

In recent years, the miniaturization of mobile phone terminals has advanced, and to improve the effective use of space and the usability, sliding-type structures in which a housing with a display formed thereon and another housing with a keyboard formed thereon are placed on top of each other have become more common. In such sliding-type mobile phone terminals, for example, a display is provided on the upper housing and a keyboard and the like are provided on the lower housing. In this way, a user can always view the display. Further, by sliding one housing with respect to the other housing in a lengthwise direction or a crosswise direction, the keyboard is exposed, and thereby a user can operate the keyboard.

Meanwhile, in recent years, more and more functions have been incorporated into mobile phone terminals, let alone the telephone call function and the data communication function. For example, terminals equipped with a TV viewing function and a game function have been released, and as a result, the demand for such a feature that a user can view the display from various directions has been growing. That is, in the past when mobile phone terminals have been used only for telephone calls and emails, viewing the display in the portrait position is sufficient for their purposes. However, when they are used for one-seg use, browser use, game use, and the like, a feature that the display can be viewed in a landscape position significantly improves the usability. As a result, nowadays, mobile phones having various structures capable of changing the orientation of the display are being developed.

For example, in mobile phones disclosed in Patent documents 1, 2 and 3, when a first housing on the LCD side is slid, part of the keys arranged on a second housing on the microphone side is exposed. Further, when the first housing is rotated, all the keys arranged on the second housing are exposed. In this way, with the capability of rotating the display, it is possible to dispose some keys, which are used when the first housing is rotated, in the part of the second housing exposed by the rotation. Further, for example, the slid state is used for telephone calls, emails, and the like, whereas the rotated state is used for purposes, for which the lengthwise direction of the LCD is oriented in the horizontal direction, such as one-seg and games.

Further, mobile phones disclosed in Patent documents 4, 5 and 6 are electronic equipment formed by further placing a third housing on the first and second housings. Further, these three housings adopt such a structure that they are connected in a freely movable manner so that they can mutually slide, rotate, and open/close. By adopting the three-tiered structure like this, some keys can be disposed in the middle housing and thereby different keys can be used according to the purpose. For example, keys on the second tier and keys on the third tier can be used according to the orientation of the display.

[Patent Document 1]
Japanese Unexamined Patent Application Publication No. 2007-116712
[Patent Document 2]
Japanese Unexamined Patent Application Publication No. 2005-147401
[Patent Document 3]
Japanese Unexamined Patent Application Publication No. 2007-49294
[Patent Document 4]
Japanese Unexamined Patent Application Publication No. 2007-179525
[Patent Document 5]
Japanese Unexamined Patent Application Publication. No. 2004-40490
[Patent Document 6]
Japanese Unexamined Patent Application Publication No. 2007-174617

DISCLOSURE OF INVENTION

Technical Problem

However, in order to perform the rotational movement of the display in the above-mentioned mobile phones disclosed in Patent documents 1, 2 and 3, the housing needs first to be slid and then to be rotated. That is, two different actions need to be performed. Therefore, the operability for users cannot be improved. Further, in the above-mentioned mobile phones disclosed in Patent documents 4, 5 and 6, although different keys can be used according to the orientation of the display, three housings need to be placed on top of one another, and thus making reduction in thickness very difficult. Furthermore, the same keys are placed on more than one tier in some cases, and thus causing waste in terms of structure.

Therefore, an object of the present invention is to solve the above-described problems, that is, to reduce the thickness and to improve the operability.

Technical Solution

Accordingly, a portable information processing terminal in accordance with an exemplary embodiment of the present invention includes: a first housing and a second housing placed on top of each other; and connecting means to connect the first and second housings, the connecting means being interposed between the first and second housings, wherein the connecting means adopts a structure such that the connecting means engages with the first housing so as to be slidable in at least one direction with respect to the first housing and engages with the second housing so as to be rotatable with respect to the second housing.

Advantageous Effects

With the structure described above, the present invention can provide advantageous effects that could not have been achieved in rerated art such as reduction in the thickness of a portable information processing terminal and improvement of the operability.

EXPLANATION OF REFERENCE

Figure 1A:
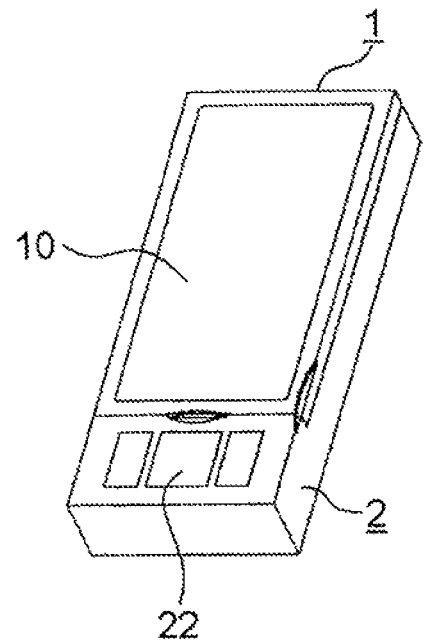
FIG. 1A shows an external appearance of a mobile phone device.

1 FIRST HOUSING
2 SECOND HOUSING
3 CONNECTING HINGE
10 DISPLAY
11 SLIDE GUIDE PIN
20 STEP PORTION
21 HIGH STEP REGION
22 SUB OPERATION PORTION, MICROPHONE PORTION
25 LOW STEP REGION
26 OPERATION PORTION
27 HINGE RECEIVING PORTION
27A FIRST GUIDE GROOVE
27B SECOND GUIDE GROOVE
31 SLIDE GUIDE GROOVE
32 FIRST GUIDE PIN
33 SECOND GUIDE PIN
34 FIRST MOVABLE LOCKING MEMBER
35 SECOND MOVABLE LOCKING MEMBER

BEST MODE FOR CARRYING OUT THE INVENTION

The present invention relates a portable information processing terminal including first and second housings placed on top of each other. Further, in particular, the first housing is configured so as to be able to slide or rotate with respect to the second housing, while attempting to reduce the thickness and to improve the operability.

Further, an exemplary embodiment of the present invention includes connecting means to connect the first and second housings, the connecting means being interposed between the first and second housings, wherein the connecting means adopts a structure such that the connecting means engages with the first housing so as to be slidable in at least one direction with respect to the first housing and engages with the second housing so as to be rotatable with respect to the second housing.

In accordance with the above-mentioned present invention, firstly, the first and second housings are connected with connecting means provided therebetween. Further, since the connecting means engages with the first housing such that the connecting means is slidable with respect to the first housing, the first housing is slidable with respect to the second housing. Further, since the connecting means engages with the second housing such that the connecting means is rotatable with respect to the second housing, the first housing is rotatable with respect to the second housing. Therefore, by providing only connecting means having the above-described structure between the first and second housings, two kinds of actions, i.e., the sliding movement and the rotational movement of the first housing with respect to the second housing can be realized. As a result, the thickness of the portable information processing terminal can be reduced and the operability can be improved.

Further, the above-described connecting means adopts a structure such that: the surfaces located on the mutually opposite sides of the connecting means face against and engage with the first housing and the second housing respectively; slide means that slides the connecting means and the first housing with respect to each other is provided in the portion where the connecting means faces against the first housing; and rotation means that rotates the connecting means and the second housing with respect to each other is provided in the portion where the connecting means faces against the second housing.

Further, the rotation means adopts a structure such that rotation means includes axially-support means to axially support the connecting means so that the connecting means can rotate with respect to the second housing, and rotation guide means to guide the rotational movement of the connecting means with respect to the second housing. Furthermore, the axially-support means is configured such that the position of the rotation center of the connecting means is movable during the rotational movement of the connecting means and is located at the same position at the start and end of rotation. In particular, the axially-support means adopts a structure such that the position of the rotation center of the connecting means is movable along a direction in which the first housing is slidable during the rotational movement of the connecting means.

In this way, since the position of the connecting means is movable during the rotational movement, the position of the vertex of the first housing that rotates with the connecting means can be moved. Therefore, it is possible to prevent the vertex of the first housing from contacting a part of the second housing and the like, and therefore a smooth rotational movement can be realized. As a result, the operability can be improved.

Further, in accordance with the present invention, it adopts a structure such that: each of the first and second housings has a roughly rectangular shape; and letting W1 stand for the length of the first and second housings in the short-side direction, letting W2 stand for the length of the first housing in the long-side direction, and letting L stand for the distance from a predetermined vertex of the first housing to the rotation support point in the short-side direction and the long-side direction, the rotation center of the connecting means is located at a position expressed as "L=(W1+W2)/4" at the start and end of rotation.

Furthermore, in accordance with the present invention, it adopts a structure such that movement locking means that locks the movement of the connecting means in such a manner that the connecting means does not move with respect to the second housing when the connecting means is sliding with respect to the first housing, and that the connecting means does not move with respect to the first housing when the connecting means is rotating with respect to the second housing is provided. In this way, when either one of the movements is being performed, the other movement can be prevented. That is, simultaneous sliding and rotational movements can be prevented, and therefore the operability can be improved.

Further, in accordance with the present invention, it adopts a structure such that the second housing formed so as to have a step, and the first housing is placed and mounted on a low step region of the step. Furthermore, it adopts a structure such that an operation portion and/or a microphone portion is provided in a high step region of the second housing. In this way, sliding or rotating is performed while the first housing is located away from the high step region of the second housing. Therefore, by providing an operation portion and a microphone portion in this high step region of the second housing, a user can use them more easily and the operability can be thereby improved.

Specific structures and operations of a portable information processing terminal in accordance with the present invention are explained hereinafter with exemplary embodiments. Note that the following exemplary embodiments are explained by taking a mobile phone device that is constructed by placing a first housing equipped with a display and a second housing equipped with an operation portion on top of each other as an example. However, portable information processing terminals in accordance with the present invention are not limited to mobile phone devices, and may be any information processing terminals such as PDAs, portable game machines, and compact personal computers. Further, the display and the operation portion do not necessarily have to be provided in the first housing and the second housing respectively. Instead, the actual structure is arbitrary. For example, both the display and the operation portion can be provided in the first housing.

<First Exemplary Embodiment>

A first exemplary embodiment of the present invention is explained with reference to FIGS. 1A to 22B. FIGS. 1A to 1D show external appearances of a mobile phone device. FIGS. 2A to 7B are diagrams for explaining a structure of a mobile phone device. FIGS. 8A to 20B show operations of a mobile phone device. FIGS. 21A to 22B show a structure of a mobile phone device.

Firstly, as shown in FIG. 1A, a mobile phone device in accordance with this exemplary embodiment includes a first housing 1 and a second housing 2 that are placed on top of each other. Further, the first housing 1 is formed in a roughly rectangular shape, and is placed and mounted on the second housing 2 that is formed in a rectangular shape whose short side has the same length as that of the first housing 1 as described later. This first housing 1 includes a display 1 such as a LCD (Liquid Crystal Display) on the surface. Further, the first housing 1 also includes a speaker 13 that outputs sounds for telephone call near the upper end as shown in FIG. 1A. Furthermore, the first housing 1 includes a concave portion for sliding 11, which is used when a user pushes up the first housing 1 itself upward by using his/her thumb, on the short side near the lower end. Furthermore, the first housing 1 also includes a concave portion for rotation 12 that is pressed by a user in a crosswise direction when the first housing 1 is to be rotated as described later. Note that these concave portions 11 and 12 do not necessarily have to be formed in a concave shape, and any shapes may be used: For example, the concave portion for sliding 11 may be formed as a protrusion so that the thumb is engaged with it. Alternatively, the concave portion for sliding 11 may not be formed, and a concave portion may be formed in a portion of the second housing 2 that contacts the lower end portion of the first housing 1.

Figure 1B:
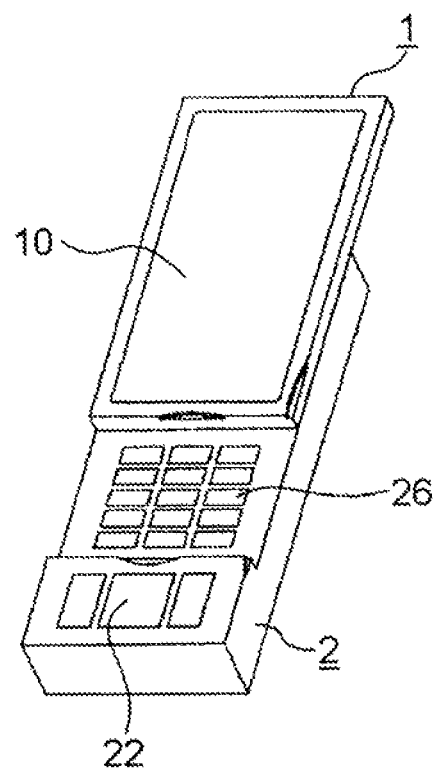
FIG. 1B shows an external appearance of a mobile phone device.
Figure 1C:
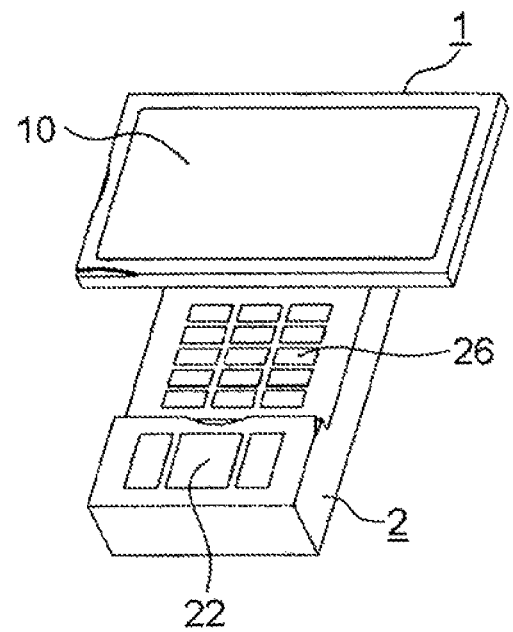
FIG. 1C shows an external appearance of a mobile phone device.
Figure 1D:
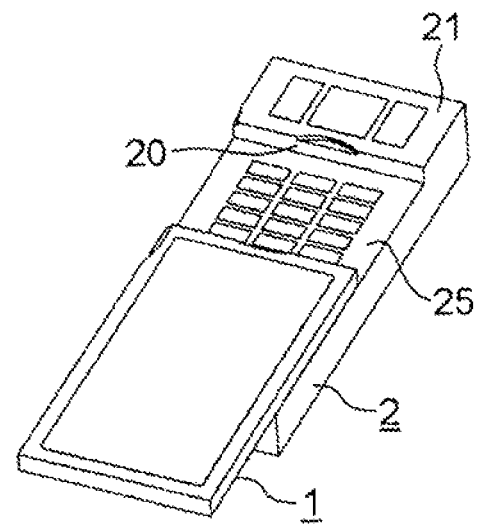
FIG. 1D shows an external appearance of a mobile phone device.

Further, a step portion 20 is formed on the second housing 2 as shown in FIG. 1D, and the second housing 2 thereby includes a high step region 21 and a low step region 25. Furthermore, the low step region 25 has substantially the same outside shape as that of the above-described first housing 1, and the first housing 1 is placed and mounted on that portion. Therefore, the short side on the lower end side of the first housing 1 comes into contact with the step portion 20. Further, a roughly square-shaped recessed portion (hinge receiving portion 27) is provided in the upper portion of the low step region 25, and a connecting hinge 3 (connecting means) that connects the first housing 1 with the second housing 2 is accommodated there.

Further, an operation portion 25 such as a numeric keypad is provided in the lower portion of the low step region 25 of the second housing 2. As described later, this operation portion 25 is normally covered by the first housing 1, but is exposed when the first housing 1 is slid or rotated. Further, a sub-operation portion 21 such as an arrow key is provided on the surface of the high step region 21 of the second housing 2. Furthermore, a microphone 23 (microphone portion) through which a user utters voice during a telephone call is provided in its lower end portion. Furthermore, this high step region 21 is formed such that its height becomes substantially the same as the height of the surface of the display 10 when the first housing 1 is being mounted on the low step region 25 as shown in FIG. 1A.

Figure 2A:
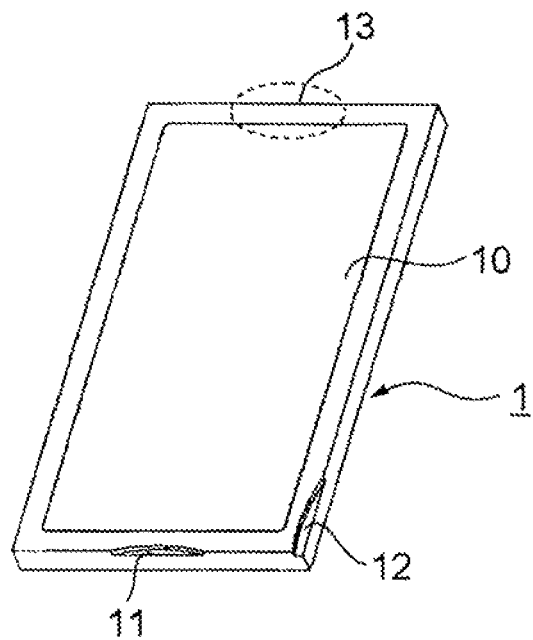
FIG. 2A shows a structure of a first housing.
Figure 2B:
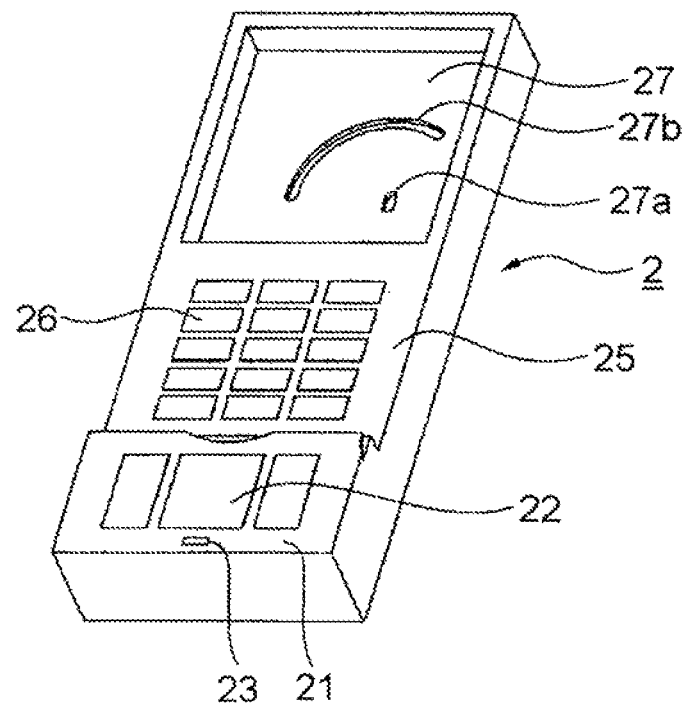
FIG. 2B shows a structure of a second housing.
Figure 3A:
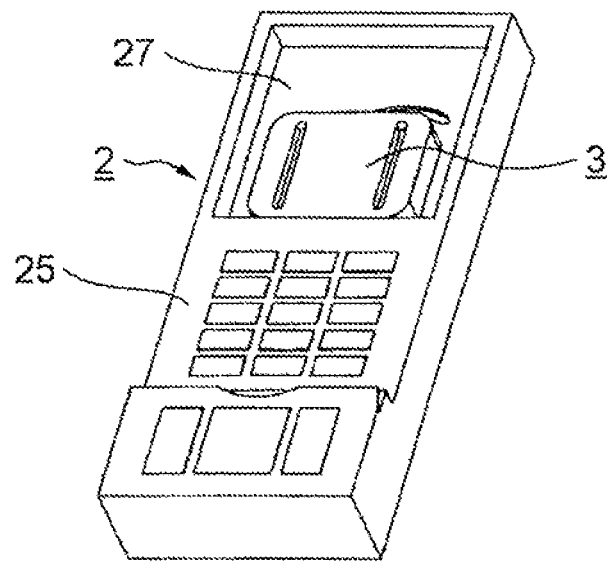
FIG. 3A shows a structure of a second housing and a connecting hinge.
Figure 3B:
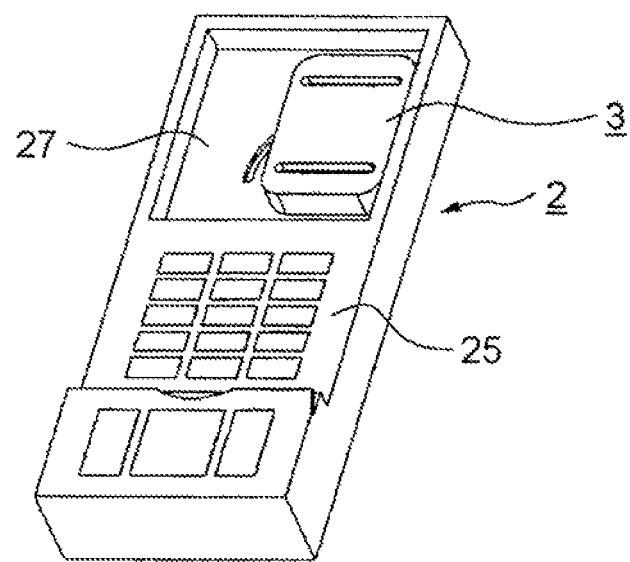
FIG. 3B shows a structure of a second housing and a connecting hinge.
Figure 5A:
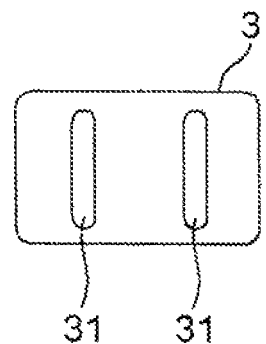
FIG. 5A shows a structure of a connecting hinge.
Figure 5B:
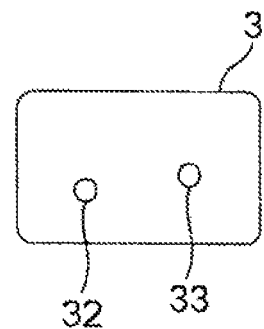
FIG. 5B shows a structure of a connecting hinge.

Next, the above-mentioned connecting hinge 3 is explained hereinafter. As shown in FIGS. 3A and 3B, the connecting hinge 3 has roughly a rectangular parallelepiped shape, and is accommodated in such a manner that one surface of the connecting hinge 3 is in contact with or located near the inner bottom surface of the hinge receiving portion 27 formed in the second housing 2. Further, FIG. 5 shows the surface of the connecting hinge 3 that faces against the second housing 2, on which a first guide pin 32 and a second guide pin 33, each of which protrudes in a column shape, are provided. Further, the first guide pin 32 and the second guide pin 33 are inserted through grooves 27a and 27b, respectively, that are formed in the inner bottom surface of the hinge receiving portion 27 as shown in FIG. 2B.

Note that the grooves 27a and 27b formed in the above-mentioned hinge receiving portion 27 are, respectively, a first guide groove 27a that axially supports the above-mentioned first guide pin 32 such that the first guide pin 32 substantially rotates and a second guide groove 27b that guides the rotational movement of the above-mentioned second guide pin 33 such that the second guide pin 33 moves substantially along a circular arc. More specifically, the first guide groove 27a is a groove having a small length along the lengthwise direction of the second housing 2. Further, the above-mentioned first guide pin 32, which is disposed within the first guide groove 27a, is positioned at the lower end portion at the start of rotation, moves upward as the rotation starts, and is positioned at the lower end portion again at the end of the rotation. In this manner, the above-mentioned first guide pin 32 and the above-mentioned first guide groove 27a function as axially-support means that axially supports the rotational movement of the connecting hinge 3. Further, the second guide groove 27b is a groove that extends as a substantially circular arc. Then, the above-mentioned second guide pin 33 is located within the second guide groove 27b and moves along that groove 27b. In this manner, the smooth rotation of the connecting hinge 3 becomes smooth. Therefore, the first guide pin 32 and the second guide groove 27 function as rotation guide means that guides the rotational movement of the connecting hinge 3. Note that shapes and operations of these components are described later.

By rotating the connecting hinge 3 with respect to the second housing 2 in the manner described above, the first housing 1, which engages with the connecting hinge 3, can be moved with respect to the second housing 2. Therefore, the guide pins 32 and 33 provided in the connecting hinge 3 and the guide grooves 27a and 27b, which are formed in the second housing 2 and through which these guide ping are inserted, function as rotation means that rotates the first housing 1 with respect to the second housing 2. Note that FIG. 1C shows an aspect where the first housing 1 is rotated. By rotating and orienting the display 10 in the lateral direction, it can be used for various purposes such as Web site viewing, games, and one-seg TV, as well as email creation/transmission/reception.

Figure 4:
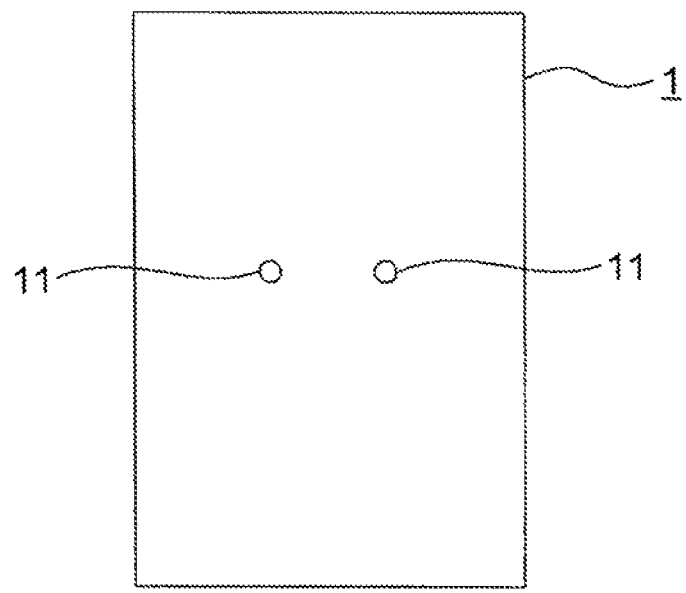
FIG. 4 shows a structure of a first housing.

Further, the other surface of the connecting hinge 3 opposite to the surface that is in contact with or located near the above-mentioned second housing 2 is located so as to face against the first housing 2, and this surface comes into contact with or comes close to the first housing 2. Further, two slide guide grooves 31 are provided on this surface of the connecting hinge 3 as shown in FIGS. 3A and 5A. As shown in FIG. 3A, these slide guide grooves 31 are formed such that these grooves 31 extend along the lengthwise direction of the second housing 2 when the connecting hinge 3 is not rotated. Further, two slide guide pins 11, each of which protrudes in a column shape, are provided in the rear surface of the first housing 1 as shown in FIG. 4 such that-they correspond to the two slide guide grooves 31 of the connecting hinge 3. By inserting these slide guide pins 11 through the slide guide grooves 31 of the connecting hinge 3, these guide pins 11 slide along the slide guide grooves 31. That is, the first housing 1 slides with respect to the second housing 2 along the lengthwise direction of the second housing 2. In this manner, the slide guide pins 11 and the slide guide grooves 31 function as slide means that slides the first housing 1 with respect to the second housing 2 in at least one direction. Note that FIG. 1B shows an aspect where the first housing 1 is slid. By performing sliding in this manner, more keys are exposed while the display 10 remains in the portrait position, and they can be thereby used for creating text such as emails. Further, since the speaker provided at the upper end of the first housing 1 and the microphone 23 provided at the high step region, i.e., lower end portion of the second housing 2 move away from each other, they can be used for a telephone call.

Furthermore, in this exemplary embodiment, the first housing 1 and the second housing 2 are configured such that only one of the slide movement and the rotation movement can be performed. That is, only one of the slide movement and the rotation movement can be performed in a state shown in FIG. 1A where the first housing 1 is closed. To this end, as shown in FIGS. 6A to 7B, movement locking means is provided in the connecting hinge 3 in this exemplary embodiment. Details of this feature are explained hereinafter.

Figure 6A:
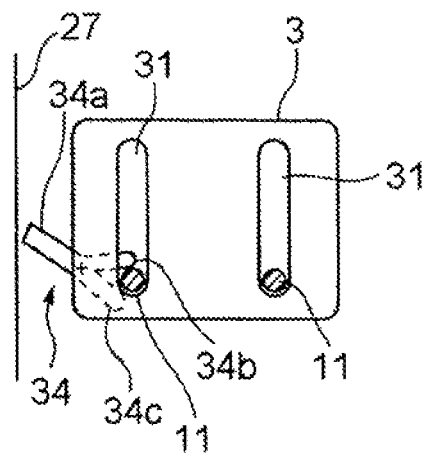
FIG. 6A shows a structure of a first movable locking member.
Figure 6B:
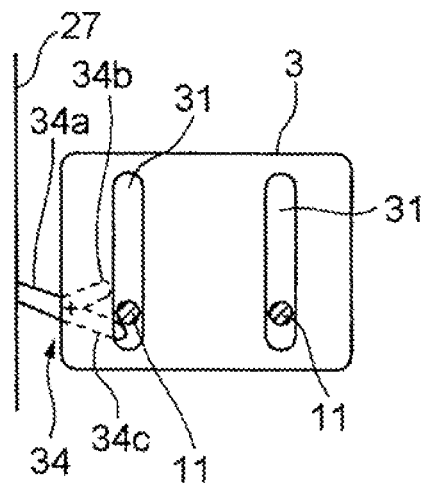
FIG. 6B shows a structure of a first movable locking member.

Firstly, in an example shown in FIGS. 6A and 6B, roughly Y-shaped first movement locking member 34 is provided in the connecting hinge 3. This first movement locking member 34 includes three branch portions 34a, 34b and 34c, and is axially supported on the connecting hinge 3 at the center of these branch portions. Further, a slide guide pint 11 is positioned in the lower portion of a slide guide groove 31 as shown in FIG. 6A. Therefore, when the first housing 1 is in a closed state, one branch portion 34b is positioned over the slide guide groove 34. Then, when the first housing 1 starts to slide and the slide guide pin 11 moves upward as shown in FIG. 6B, the slide guide pin 11 pushes up one branch portion 34b and thereby rotates the first movement locking member 34. As a result, another branch portion 34a comes into contact with a sidewall of the hinge receiving portion 27, in which the connecting hinge 3 is accommodated, and its friction prevents the connecting hinge 3 from being rotated. Further, at this point, another branch portion 34c is positioned at the lower end portion of the slide guide groove 31. Therefore, when the first housing 1 is closed after that, the slide guide pin 11 returns to the lower end portion of the slide guide groove 31 and thereby presses down the branch portion 34c to the state shown in FIG. 6A. As a result, the first movement locking member 34 is disengaged from the contacting state with the sidewall of the hinge receiving portion 27, and thereby the rotation becomes possible.

Figure 7A:
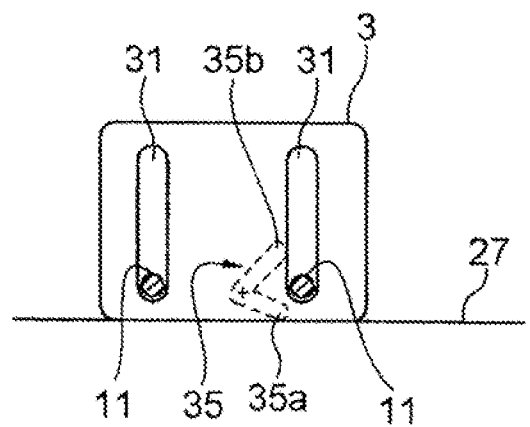
FIG. 7A shows a structure of a second movable locking member.
Figure 7B:
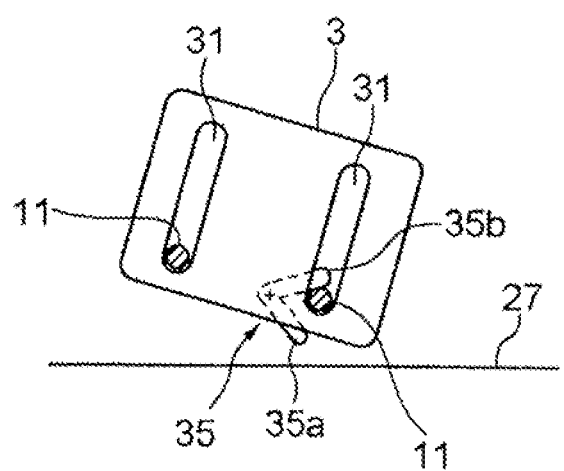
FIG. 7B shows a structure of a second movable locking member.

Further, in an example shown in FIGS. 7A and 7B, roughly V-shaped second movement locking member 35 is provided in the connecting hinge 3. This second movement locking member 35 includes two branch portions 35a and 35b bent from each other, and is axially supported on the connecting hinge 3 at the center of these branch portions. Further, the connecting hinge 3 is in contact with a side surface of the lower end portion of the hinge receiving portion 27 as shown in FIG. 7A. Therefore, when the first housing 1 is in a closed state, one branch portion 35a is pressed upward by the sidewall of the hinge receiving portion 27. Note that the second movement locking member 35 is urged by the rotational force of a torsion spring or the like so as to rotate in the clockwise direction. Then, when the first housing 1 starts to rotate and the connecting hinge 3 is thereby moved away from the sidewall of the lower end portion of the hinge receiving portion 27 as shown in FIG. 7B, the second movement locking member 35 rotates in the clockwise direction and the other branch portion 35b thereby protrudes over the slide guide groove 31. As a result, the slide guide pin 11 is held down by this branch portion 35b and its movement is thereby prevented. Consequently, the slide movement is prevented. Further, when the first housing 1 is returned from the rotated state after that, the connecting hinge 3 returns to the original position and the second movement locking member 35 is pressed upward by the side surface on the lower end side of the hinge receiving portion and brought into a state shown in FIG. 7A. Consequently, the slide movement becomes possible.

As described above, in this exemplary embodiment, when the first housing 1 is in a sliding action, the connecting hinge 3 cannot rotate with respect to the second housing 2 and the rotation of the first housing 1 is thereby impossible. On the other hand, when the first housing 1 in a rotational action, the first housing 1 cannot slide with respect to the connecting hinge 3 and the sliding of the first housing 1 is thereby impossible. In this manner, the operability can be improved. Note that the structures of the first and second movement locking members 34 and 35 that are explained above as movement locking means is merely an example, and the feature that when one of the actions is being performed, the other action is locked may be realized by using other structures.

Figure 8A:
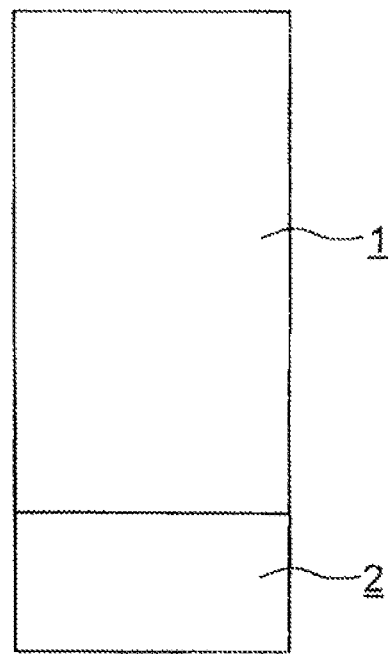
FIG. 8A is a diagram for explaining rotation trajectories of a first housing.
Figure 8B:
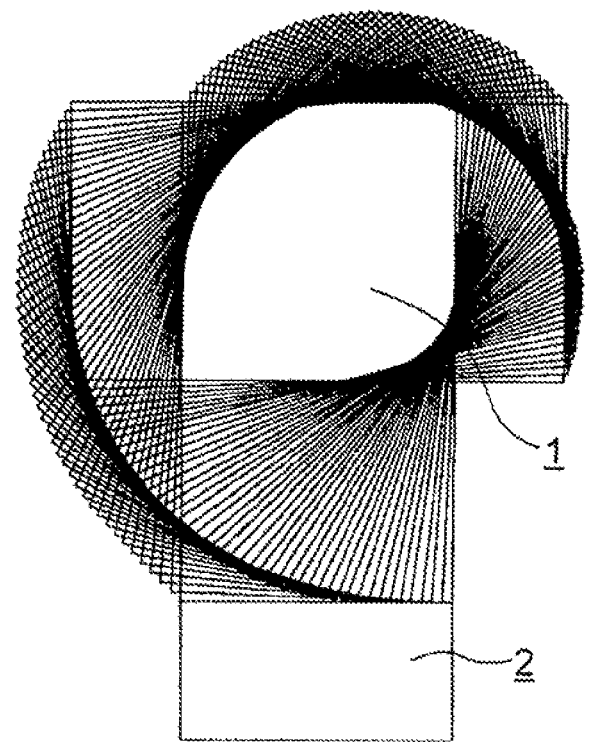
FIG. 8B shows rotation trajectories of a first housing.
Figure 9A:
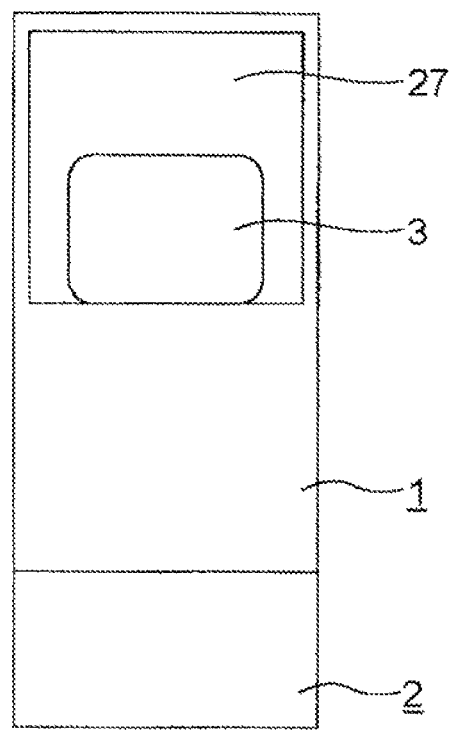
FIG. 9A is a diagram for explaining rotation trajectories of a connecting hinge.
Figure 9B:
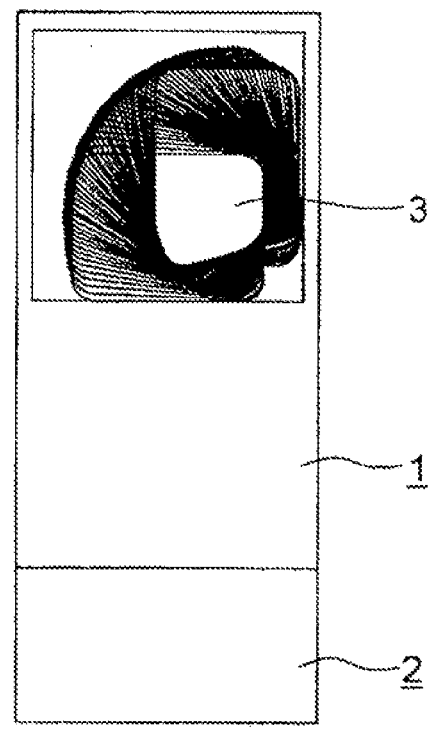
FIG. 9B shows rotation trajectories of a connecting hinge.
Figure 10A:
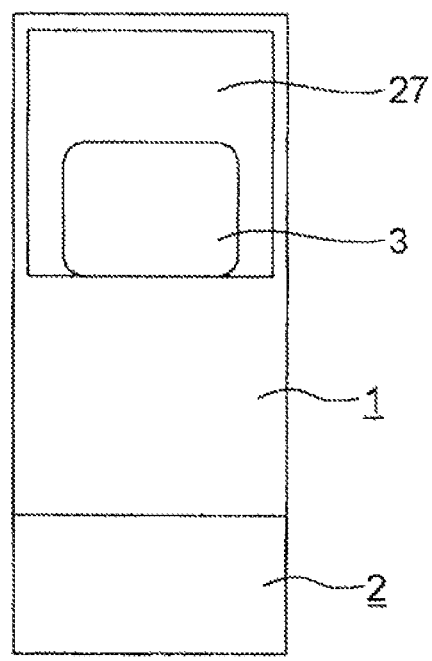
FIG. 10A is a diagram for explaining rotation trajectories of a first housing and a connecting hinge.
Figure 10B:
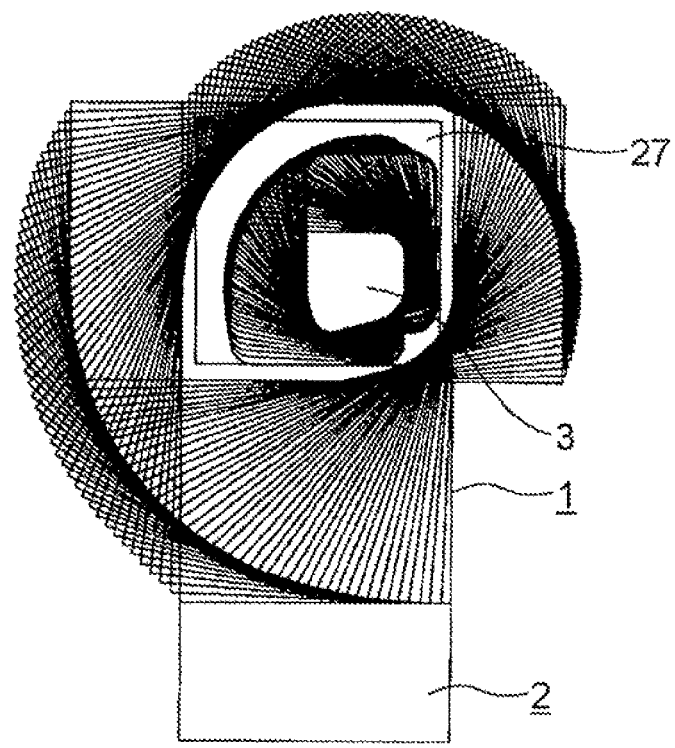
FIG. 10B shows rotation trajectories of a first housing and a connecting hinge.

Next, the above-described rotational movement of the first housing 1 is further described hereinafter in detail. Firstly, FIGS. 8A, 8B, 9A, 9B, 10A and 10B show trajectories of the rotation of the first housing 1. Specifically, FIG. 8B shows only trajectories of the first housing 1 shown in FIG. 8A, and FIG. 9B shows only trajectories of the connecting hinge 3 shown in FIG. 9A. Further, FIG. 10B shows trajectories of the first housing 1 and the connecting hinge 3 shown in FIG. 10A.

Figure 11A:
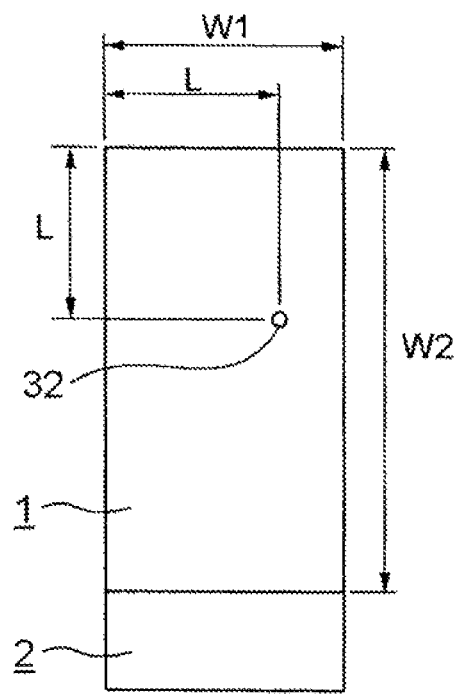
FIG. 11A is a diagram for explaining a position of a first guide pin.
Figure 11B:
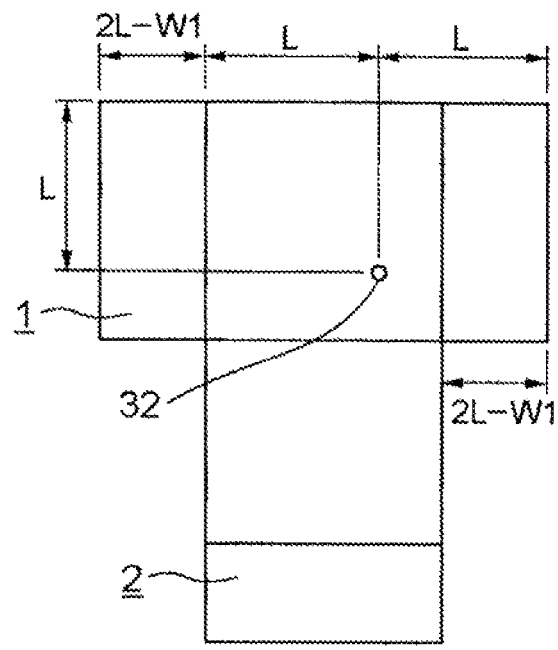
FIG. 11B is a diagram for explaining a position of a first guide pin.

Next, by using the above-mentioned trajectories as a reference, the position of the first guide pin 32 of the connecting hinge 3 that rotates with the first housing 1 and the first guide groove 27a that supports the first guide pin 32 are explained hereinafter. Note that the first guide pin 32 serves as the rotation center of the first housing 1. Firstly, assume a case where in the state of the first housing 1 after rotation, a long side of the first housing 1 matches with a short side of the second housing 2 and the center of the long side of the first housing 1 matches with the center of the short side of the second housing as shown in FIGS. 11A and 11B. In such a case, an equation "W2=(2L−W1)+L+L" is satisfied as shown in FIG. 11B. Note that the side that protrudes when the first housing 1 is slid is defined as a front-end side, and the distance from one vertex on the front-end side to the first guide pin 32 along the long-side direction and the short-side direction is represented by L. Further, an equation "L=(W1+W2)/4" is derived from the above equation. Therefore, the first guide pin 32 is preferably provided at a position that is away from the vertex on the front-end side of the first housing 1 by the distance L satisfying this equation.

Figure 12A:
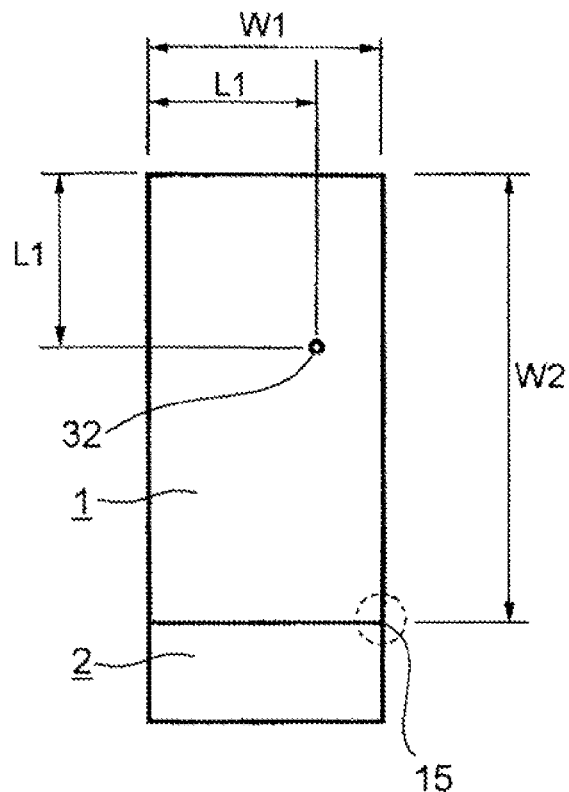
FIG. 12A is a diagram for explaining trajectories of a first guide pin while the first housing is rotating.
Figure 12B:
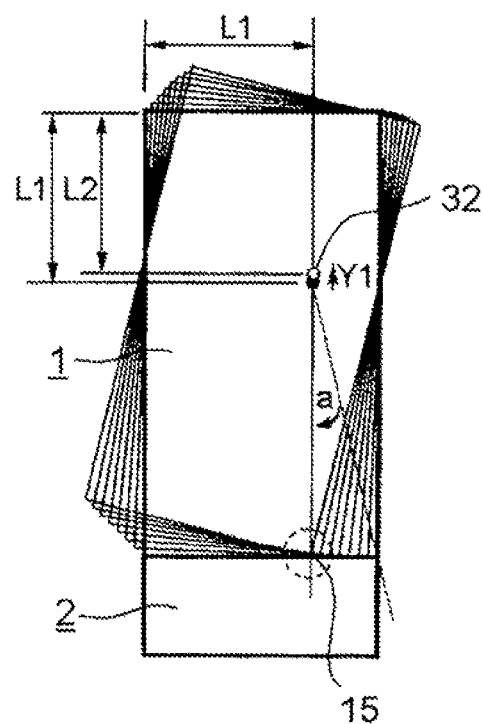
FIG. 12B shows trajectories of a first guide pin while the first housing is rotating.
Figure 13A:
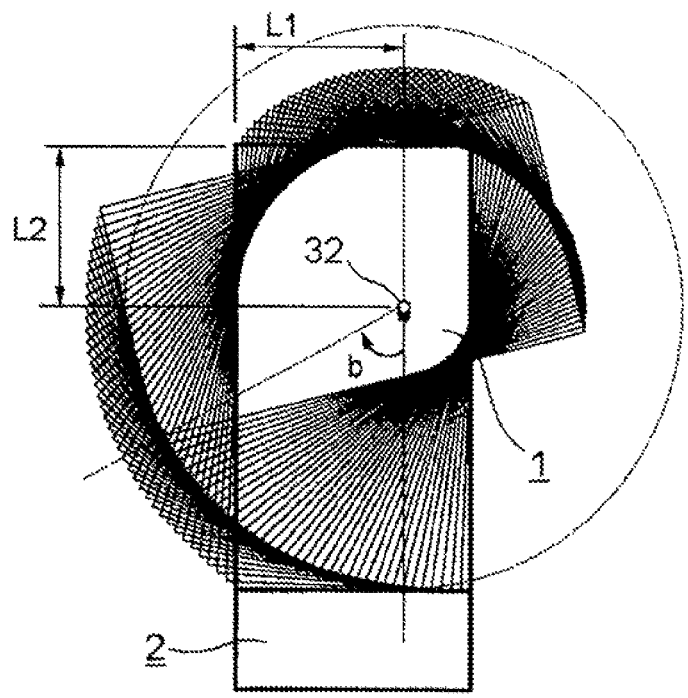
FIG. 13A shows an example of a shape of a second guide groove.
Figure 13B:
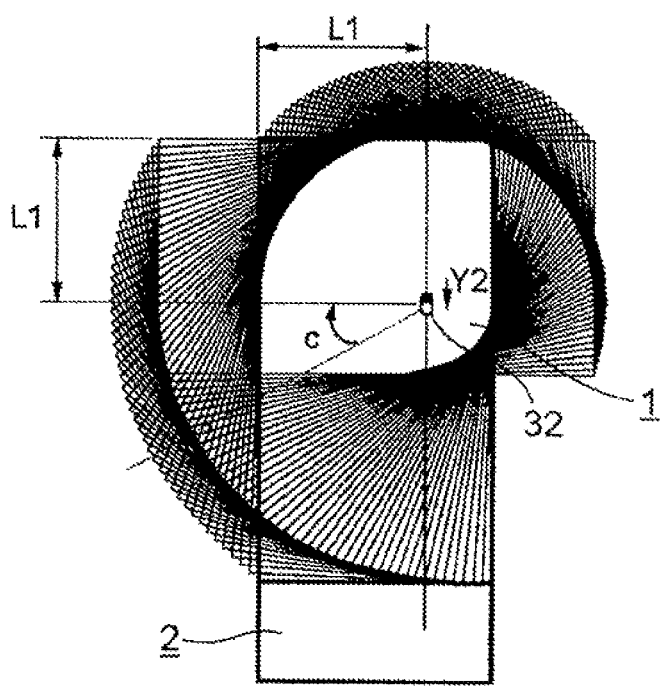
FIG. 13B shows an example of a shape of a second guide groove.

However, if the first guide pin 32 is provided at the position of the above-mentioned L, a vertex 15 of the first housing 1 located on the step portion side of the second housing 2, which is indicated by the sign 15 in FIG. 12A, moves along a circular-arc trajectory during rotation, and thereby could come into contact with the step of the second housing 2. Therefore, as indicated by the arrow Y1 in FIG. 12B, the first guide pin 32 is preferably moved upward while it is rotated. As a result, since the vertex 15 of the first housing 1 moves away from the step, it can rotate without contacting the step. That is, the first guide groove 33 is formed such that the position of the first guide pin 32 is movable upward from the position at a distance of L1 (=L) from the second housing 2 to the position at a distance of L2 (<L1) from the second housing 2 during first stage rotation in which the first housing 1 rotates by an angle "a". Then, during second stage rotation in which the first housing 1 is rotated further by an angle "b", the first guide pin 32 rotates at the above-described position of L2 as shown in FIG. 13A. After that, as shown in FIG. 13B, during final stage rotation in which the first housing 1 is rotated further by an angle "c", the first guide pin 32 rotates while it moves and returns to the position of L1 (=L), which is the same position as the start point, as indicated by the arrow Y2.

As described above, the first guide groove 33, which serves as the movable trajectory of the first guide pin 32, is preferably formed in a straight-line shaped groove having a length "L1−L2" along the lengthwise direction of the second housing 2. In such a case, the first guide pin 32 is positioned at the position of L1 at the start and end of rotation, and moves between L1 and L2 during rotation. In this manner, vertexes of the first housing 1 do not come into contact with the step portion of the second housing 2, and therefore smooth rotation can be realized. Note that the shape of the first guide groove 33, which serves as the rotation trajectory of the first guide pin 32 is merely an example, and other shapes may be also used. That is, the first guide pin 32 may move along other trajectories when it rotates. Further, if no step is provided in the second housing 2 and thus there is not any portion with which the vertex of the first housing 1 comes into contact, the first housing 1 may rotate while being supported at one fixed point.

Figure 14A:
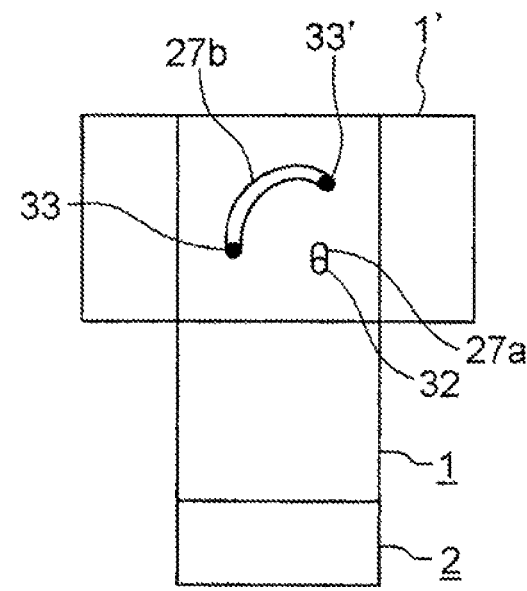
FIG. 14A shows trajectories of a first guide pin and a second guide pin while the first housing is rotating.
Figure 14B:
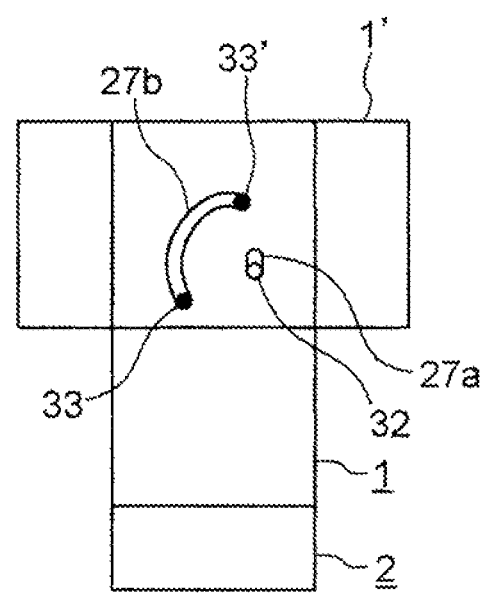
FIG. 14B shows trajectories of a first guide pin and a second guide pin while the first housing is rotating.
Figure 14C:
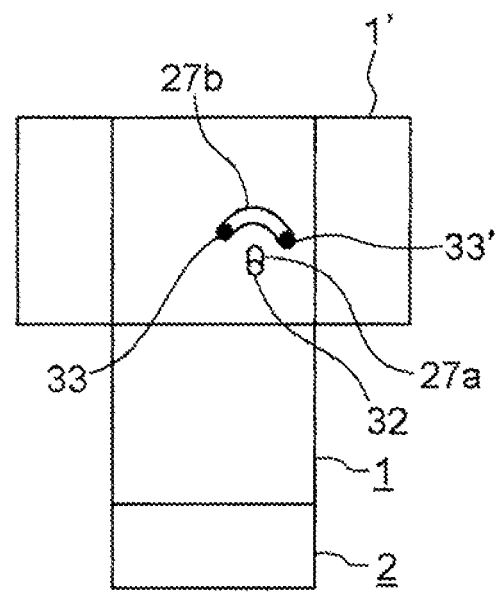
FIG. 14C shows trajectories of a first guide pin and a second guide pin while the first housing is rotating.
Figure 15A:
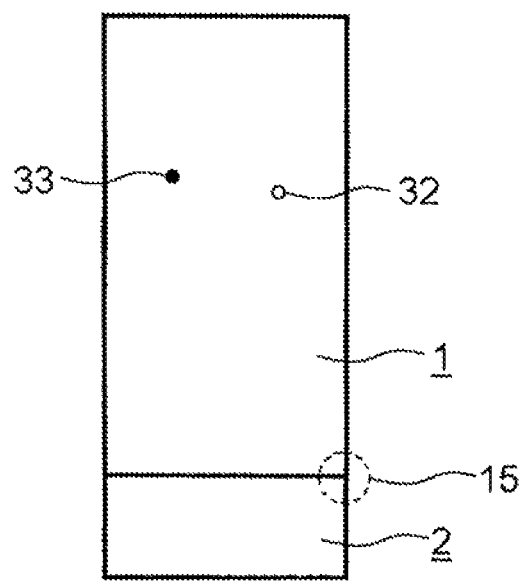
FIG. 15A is a diagram for explaining trajectories of a first guide pin and a second guide pin while the first housing is rotating.
Figure 15B:
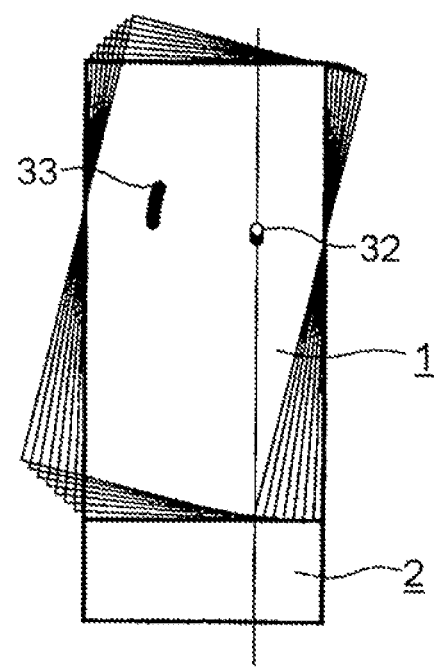
FIG. 15B shows trajectories of a first guide pin and a second guide pin while the first housing is rotating.
Figure 16A:
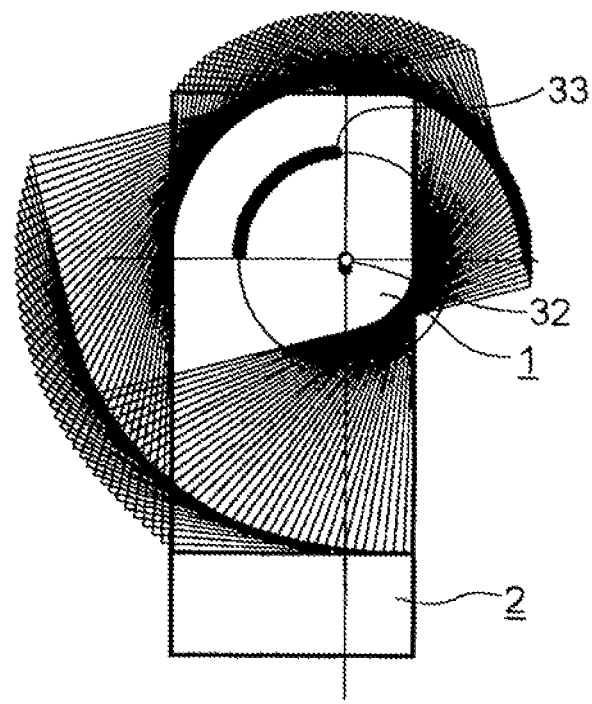
FIG. 16A shows trajectories of a first guide pin and a second guide pin while the first housing is rotating.
Figure 16B:
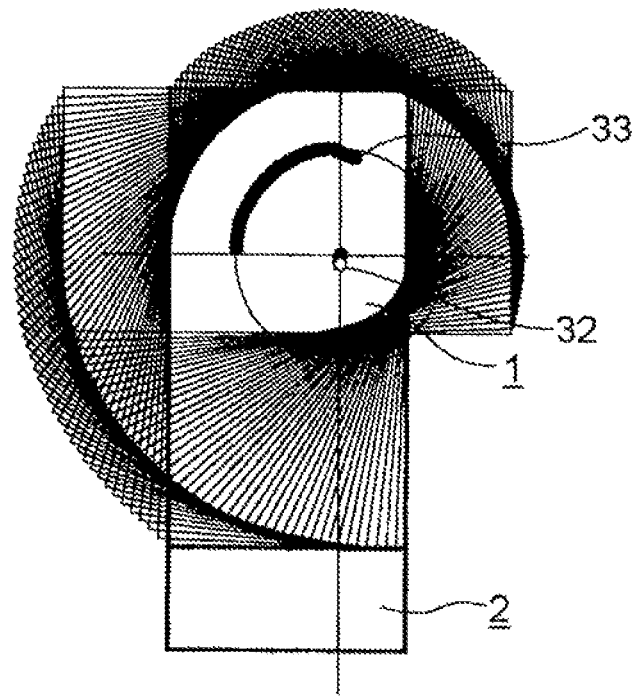
FIG. 16B shows trajectories of a first guide pin and a second guide pin while the first housing is rotating.
Figure 17A:
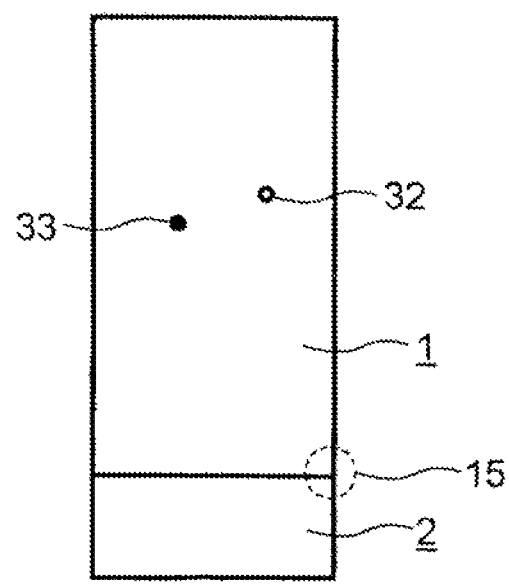
FIG. 17A is a diagram for explaining trajectories of a first guide pin and a second guide pin while the first housing is rotating.
Figure 17B:
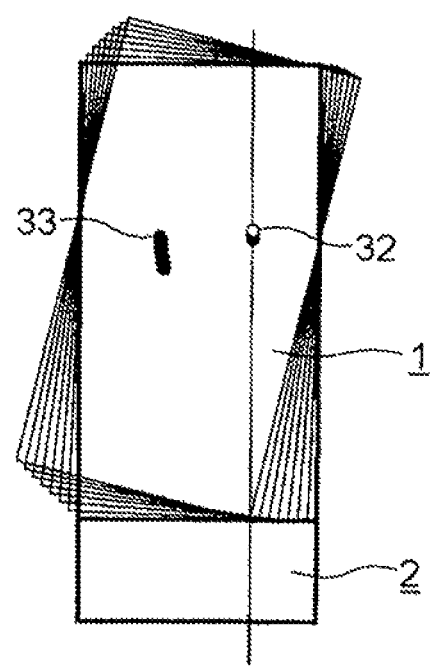
FIG. 17B shows trajectories of a first guide pin and a second guide pin while the first housing is rotating.
Figure 18A:
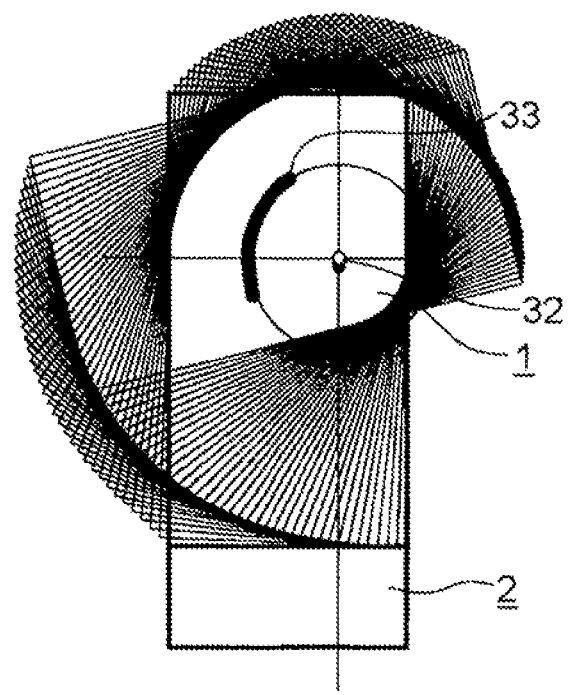
FIG. 18A shows trajectories of a first guide pin and a second guide pin while the first housing is rotating.
Figure 18B:
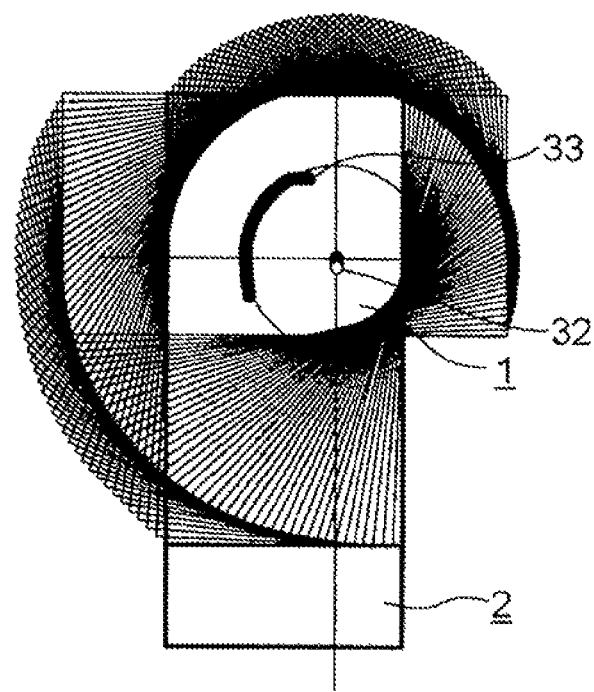
FIG. 18B shows trajectories of a first guide pin and a second guide pin while the first housing is rotating.
Figure 19A:
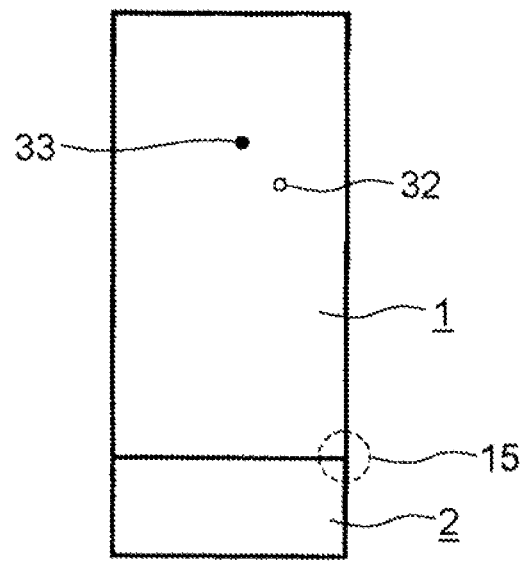
FIG. 19A is a diagram for explaining trajectories of a first guide pin and a second guide pin while the first housing is rotating.
Figure 19B:
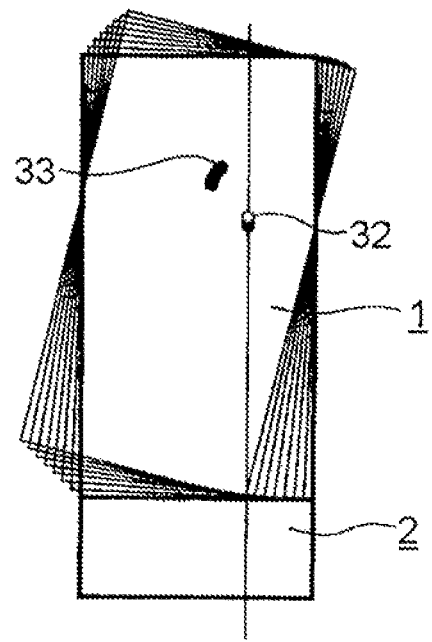
FIG. 19B shows trajectories of a first guide pin and a second guide pin while the first housing is rotating.
Figure 20A:
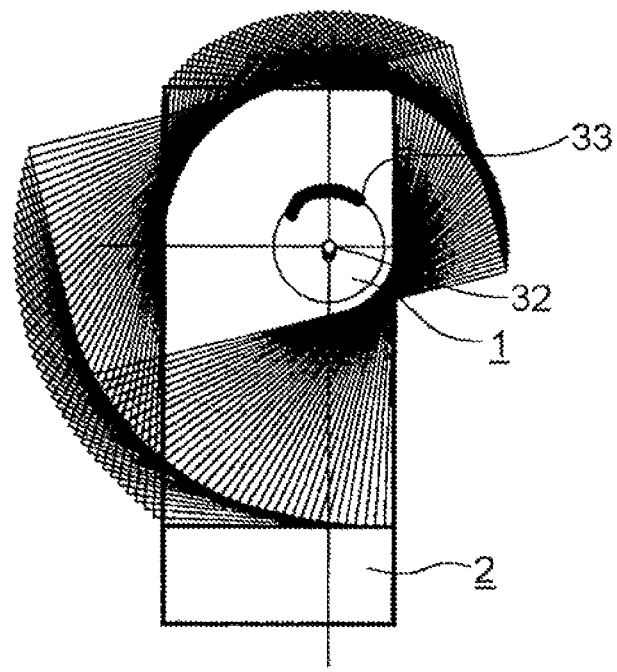
FIG. 20A shows trajectories of a first guide pin and a second guide pin while the first housing is rotating.
Figure 20B:
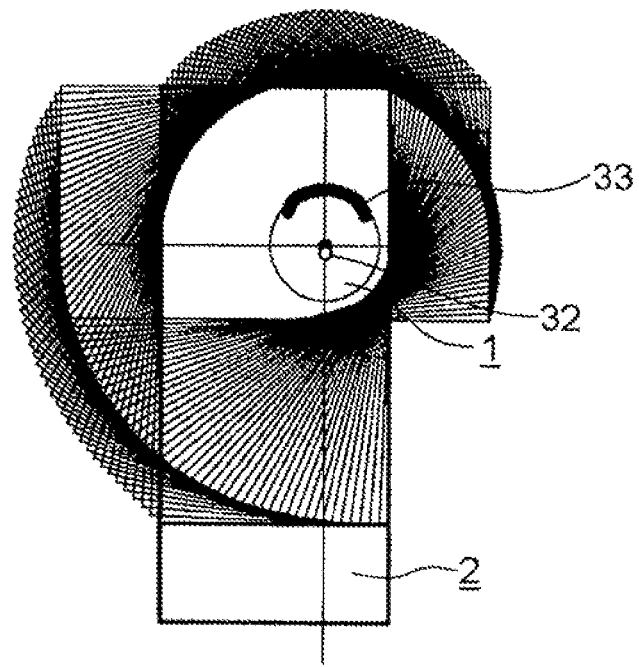
FIG. 20B shows trajectories of a first guide pin and a second guide pin while the first housing is rotating.

Further, as described above, in order to move the first guide pin 32 along the first guide groove 27a, the second guide groove 27b is also formed and serves as the movable trajectory of the second guide pin 33. That is, firstly, during the first stage rotation at the beginning of the rotation, a trajectory that moves the second guide pin 33 upward is taken so that the first guide pin 32 is lead so as to move upward. Then, during the second stage rotation, a circular-arc trajectory is taken so that the connecting hinge 3 rotates. Finally, during the final stage rotation, a trajectory that moves the first guide pin 32 downward is taken so that the first guide pin 32 returns to the original position. Note that, FIGS. 14A, 14B and 14C show several examples of the shape of the second guide groove 27b. Further, FIGS. 15A, 15B, 16A and 16B show trajectories of respective pins 32 and 33 in the case of FIG. 14A. In particular, FIGS. 15A, 15B, 16A and 16B show trajectories of the respective pins 32 and 33 before rotation, during first stage rotation, during second stage rotation, and during final stage rotation respectively. Further, FIGS. 17A, 17B, 18A and 18B show trajectories of respective pins 32 and 33 in the case of FIG. 14B. In particular, FIGS. 17A, 17B, 18A and 18B show trajectories of the respective pins 32 and 33 before rotation, during first stage rotation, during second stage rotation, and during final stage rotation respectively. Further, FIGS. 19A, 19B, 20A and 10B show trajectories of respective pins 32 and 33 in the case of FIG. 14C. In particular, FIGS. 19A, 19B, 20A and 20B show trajectories of the respective pins 32 and 33 before rotation, during first stage rotation, during second stage rotation, and during final stage rotation respectively. As described above, any shapes may be used for each of the guide grooves 27a and 27b, which serve as trajectories of the respective pins 32 and 33.

Figure 21A:
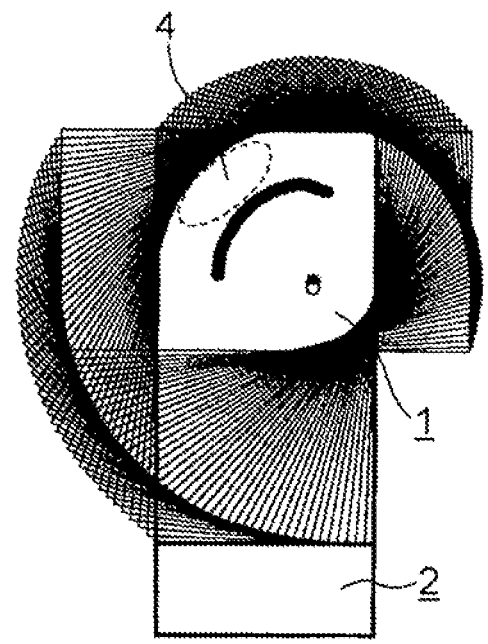
FIG. 21A shows a mounting position of a rotation assist action mechanism.
Figure 21B:
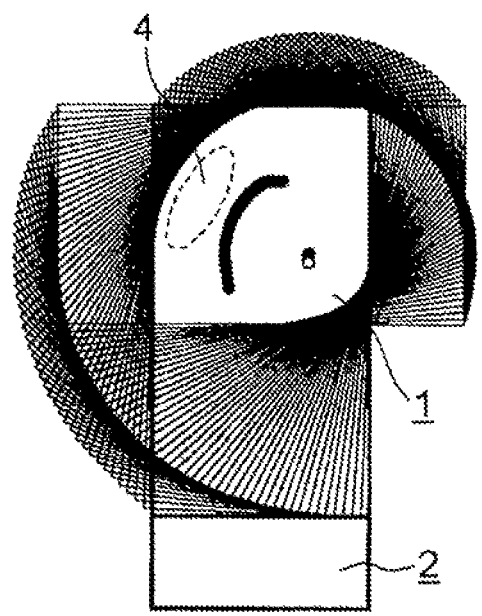
FIG. 21B shows a mounting position of a rotation assist action mechanism.
Figure 21C:
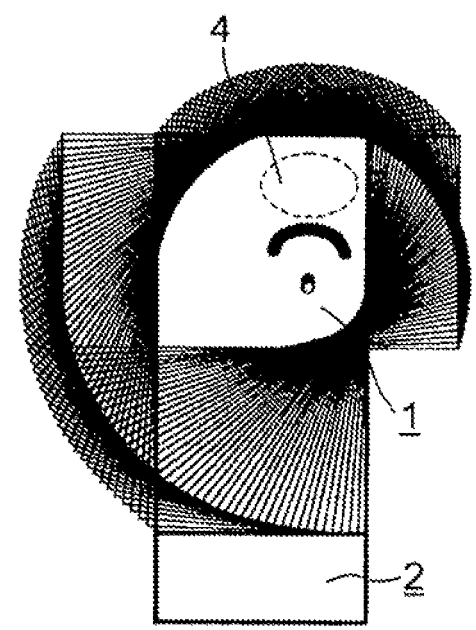
FIG. 21C shows a mounting position of a rotation assist action mechanism.
Figure 22A:
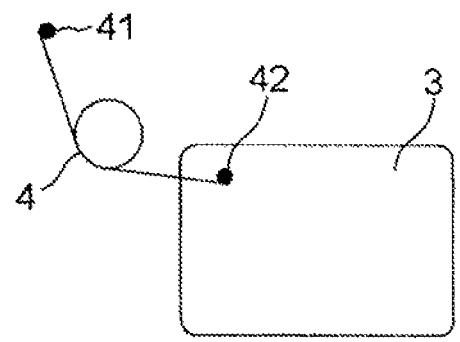
FIG. 22A shows an example of a rotation assist action mechanism.
Figure 22B:
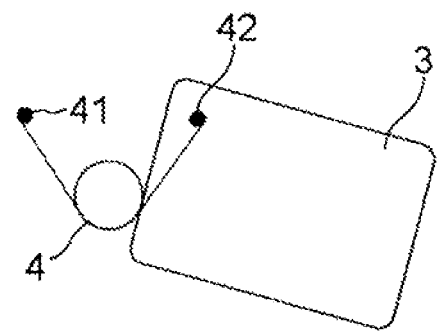
FIG. 22B shows an example of a rotation assist action mechanism.

Further, FIGS. 21A to 21C, 22A and 22B show examples where a mechanism to support the rotational movement of the first housing 1 is provided. FIGS. 21A, 21B and 21C show the cases of trajectories of the second guide pins 33 shown FIGS. 14A, 14B and 14C, respectively, and a rotational movement assist mechanism 4 is preferably provided in a position indicated by the sign 4 in each of the cases. For example, a torsion coil spring 4 shown in FIG. 22A may be used as the rotational movement assist mechanism. Further, one end of the torsion coil spring 4 is connected on the second housing 2 side, and the other end is connected to the connecting hinge 3. As a result, when the connecting hinge 3 is rotated by a certain angle as shown in FIG. 22B, the torsion coil spring 4 is compressed. Then, when the connecting hinge 3 is further rotated, the repulsive force of the compressed torsion coil spring 4 is released in the rotation direction. Therefore, the repulsive force of the spring is exerted in the rotation direction. The same holds true when rotation is performed in the opposite direction. That is, when the first housing 1 is to be rotated, a user needs to apply a rotational force to rotate the first housing 1 partway. Then, when the rotation reaches a certain angle, the repulsive force of the spring is exerted in the rotation direction, and therefore the first housing 1 can be easily rotated. Further, the returning action of the rotated first housing 1 is performed in a similar manner. That is, a user needs to apply a rotational force to rotate the first housing 1 partway, but when the rotation reaches a certain angle, the repulsive force of the spring is exerted in the rotation direction and therefore the first housing 1 can be easily rotated.

With the structure described above, in accordance with a mobile phone device in accordance with this exemplary embodiment, when a user wants to perform a sliding movement, he/she pushes the first housing 1 upward. Further, when a user wants to perform a rotational movement, he/she pushes a portion near the lower end of the first housing 1 in a lateral direction. That is, each of these movements can be performed by a single action. Therefore, the operability can be improved. Further, the feature can be accomplished by only providing the connecting hinge 3, and therefore the thickness of the mobile phone device can be reduced. Further, since the first housing 1 and the second housing 2 are supported on the surfaces of the connecting hinge 3, any localized concentration of stress can be avoided.

Although examples where the rotation direction is the clockwise direction are shown in the above description, it may be the counter-clockwise direction. Further, guide grooves may be formed in a symmetrical manner in the lateral direction so that rotation in both directions becomes possible. Further, although structures in which a guide pin(s) are inserted thorough a guide groove(s) are shown as an example, the present invention is not limited to such structures. For example, material that causes a friction force is disposed at a portion that serves as the rotation support point, and the rotation can be performed by using the friction force.

This application is the national Phase of PCT/JP2008/068154, filed Oct. 6,2008 which is based upon and claims the benefit of priority from Japanese patent application No. 2007-265118, filed on Oct. 11, 2007, the disclosure of which is incorporated herein in its entirety by reference.

Industrial Applicability

The present invention is applicable to and has industrial applicability in mobile phone terminal devices capable of dealing with one-seg use, browser use, game use, and the like.

The invention claimed is:

1. A portable information processing terminal comprises: a first housing and a second housing placed on top of each other; and a connecting structure to connect the first and second housings, the connecting structure being interposed between the first and second housings, wherein the connecting structure engages with the first housing so as to be slidable in at least one direction with respect to the first housing, and engages with the second housing so as to be rotatable with respect to the second housing, a recessed portion that accommodates the connecting structure is provided in the second housing a guide pin is provided on a surface of the connecting structure, the surface facing against the second housing, and a guide groove through which the guide pin is inserted is formed in an inner bottom surface of the recessed portion; and surfaces located on the mutually opposite sides of the connecting structure face against and engage with the first housing and the second housing respectively, and wherein the portable information processing terminal further comprises: a slide structure that slides the connecting structure and the first housing with respect to each other in a portion where the connecting structure faces against the first housing; and a rotation structure that rotates the connecting structure and the second housing with respect to each other in a portion where the connecting structure faces against the second housing.

2. The portable information processing terminal according to claim 1, wherein the rotation structure comprises an axially-support structure to axially support the connecting structure so that the connecting structure can rotate with respect to the second housing, and rotation guide structure to guide a rotational movement of the connecting structure with respect to the second housing.

3. The portable information processing terminal according to claim 2, wherein the axially-support structure is configured such that a position of a rotation center of the connecting structure is movable during a rotational movement of the connecting structure and is located at a same position at a start and an end of rotation.

4. The portable information processing terminal according to claim 3, wherein the axially-support structure is configured such that a position of a rotation center of the connecting structure is movable along a direction in which the first housing is slidable during a rotational movement of the connecting structure.

5. The portable information processing terminal according to claim 3, wherein
  each of the first and second housings has a roughly rectangular shape, and
  letting W1 stand for a length of the first and second housings in a short-side direction, letting W2 stand for a length of the first housing in a long-side direction, and letting L stand for a distance from a predetermined vertex of the first housing to a rotation support point in the short-side direction and the long-side direction, a rotation center of the connecting structure is located at a position expressed as "L=(W1+W2)/4" at a start and an end of rotation.

6. The portable information processing terminal according to claim 1, further comprising movement locking structure that locks a movement of the connecting structure in such a manner that the connecting structure does not move with respect to the second housing when the connecting structure is sliding with respect to the first housing, and that the connecting structure does not move with respect to the first housing when the connecting structure is rotating with respect to the second housing is provided.

7. The portable information processing terminal according to claim 1, wherein the second housing is formed so as to have a step, and the first housing is placed and mounted on a low step region of the step.

8. The portable information processing terminal according to claim 7, wherein an operation portion and/or a microphone portion is provided in a high step region of the second housing.

* * * * *